No. 859,235. PATENTED JULY 9, 1907.
W. W. MACFARREN.
AUTOMOBILE.
APPLICATION FILED JUNE 18, 1906.

4 SHEETS—SHEET 1.

WITNESSES.
J. R. Keller
Robert C. Totten

INVENTOR.
Walter W. Macfarren
By Kay Totten & Winter
Attorneys

No. 859,235. PATENTED JULY 9, 1907.
W. W. MACFARREN.
AUTOMOBILE.
APPLICATION FILED JUNE 18, 1906.
4 SHEETS—SHEET 2.
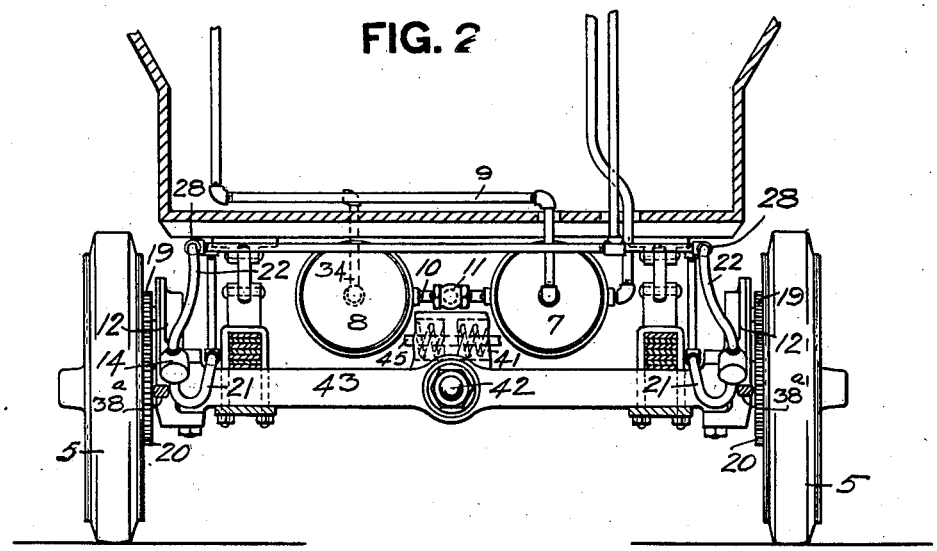
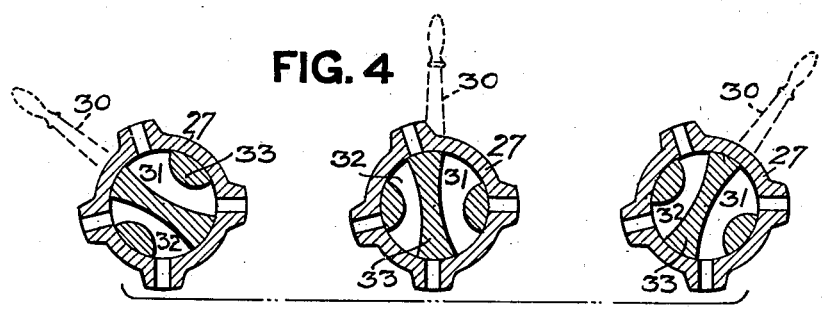
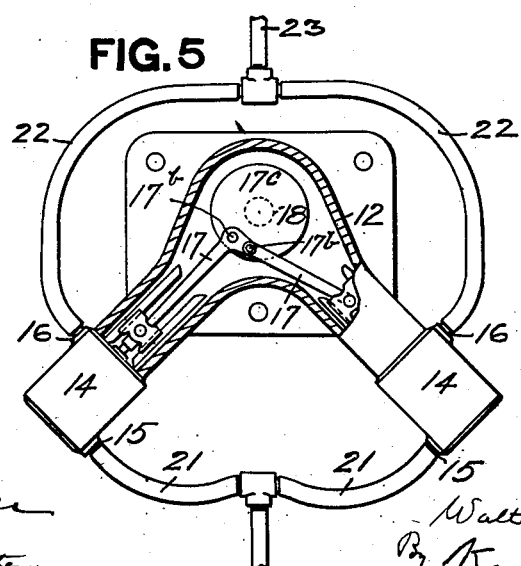
WITNESSES. INVENTOR.

No. 859,235. PATENTED JULY 9, 1907.
W. W. MACFARREN.
AUTOMOBILE.
APPLICATION FILED JUNE 18, 1906.

4 SHEETS—SHEET 3.

FIG. 3

WITNESSES.
J. R. Keller
Robert C. Totten

INVENTOR.
Walter W. Macfarren
By Kay Totten & White
Attorneys

No. 859,235. PATENTED JULY 9, 1907.
W. W. MACFARREN.
AUTOMOBILE.
APPLICATION FILED JUNE 18, 1906.

4 SHEETS—SHEET 4.

WITNESSES.

INVENTOR.

UNITED STATES PATENT OFFICE.

WALTER W. MACFARREN, OF PITTSBURG, PENNSYLVANIA, ASSIGNOR TO WILLIAM H. DONNER, OF PITTSBURG, PENNSYLVANIA.

AUTOMOBILE.

No. 859,235.

Specification of Letters Patent.

Patented July 9, 1907.

Application filed June 18, 1906. Serial No. 322,207.

*To all whom it may concern:*

Be it known that I, WALTER W. MACFARREN, a resident of Pittsburg, in the county of Allegheny and State of Pennsylvania, have invented a new and useful Improvement in Automobiles; and I do hereby declare the following to be a full, clear, and exact description thereof.

My invention relates to self-propelled vehicles and particularly to self-propelled wagons and trucks for heavy hauling, as merchandise, or large passenger busses.

The invention consists in the application of the power of an internal combustion motor to all four wheels of a vehicle, so that all the wheels are driving wheels.

The invention consists further in providing a reservoir of power between the motor and the driving wheels, so that the motor may run at a constant speed if desired, under control of a governor, while the speed of the vehicle may be varied as desired, and vice versa; the vehicle can be operated by stored power when the motor is stopped.

Figure 1:
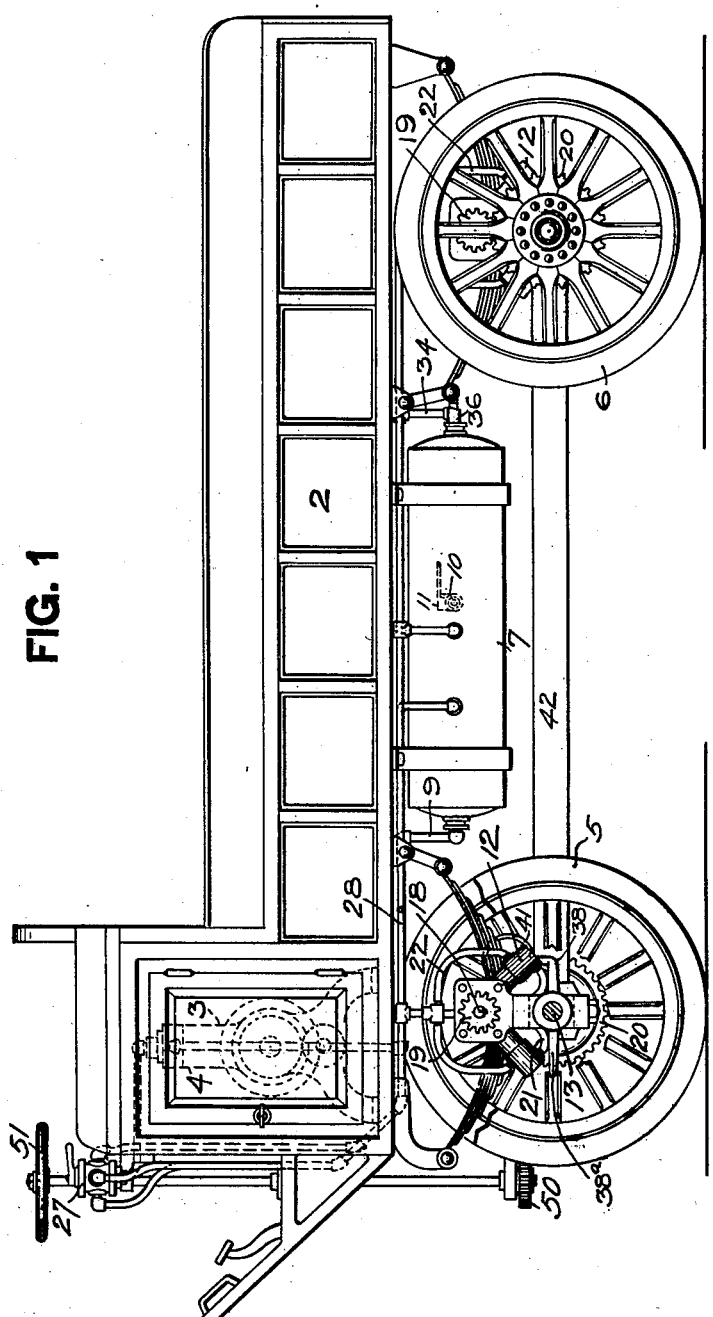
Figure 6:
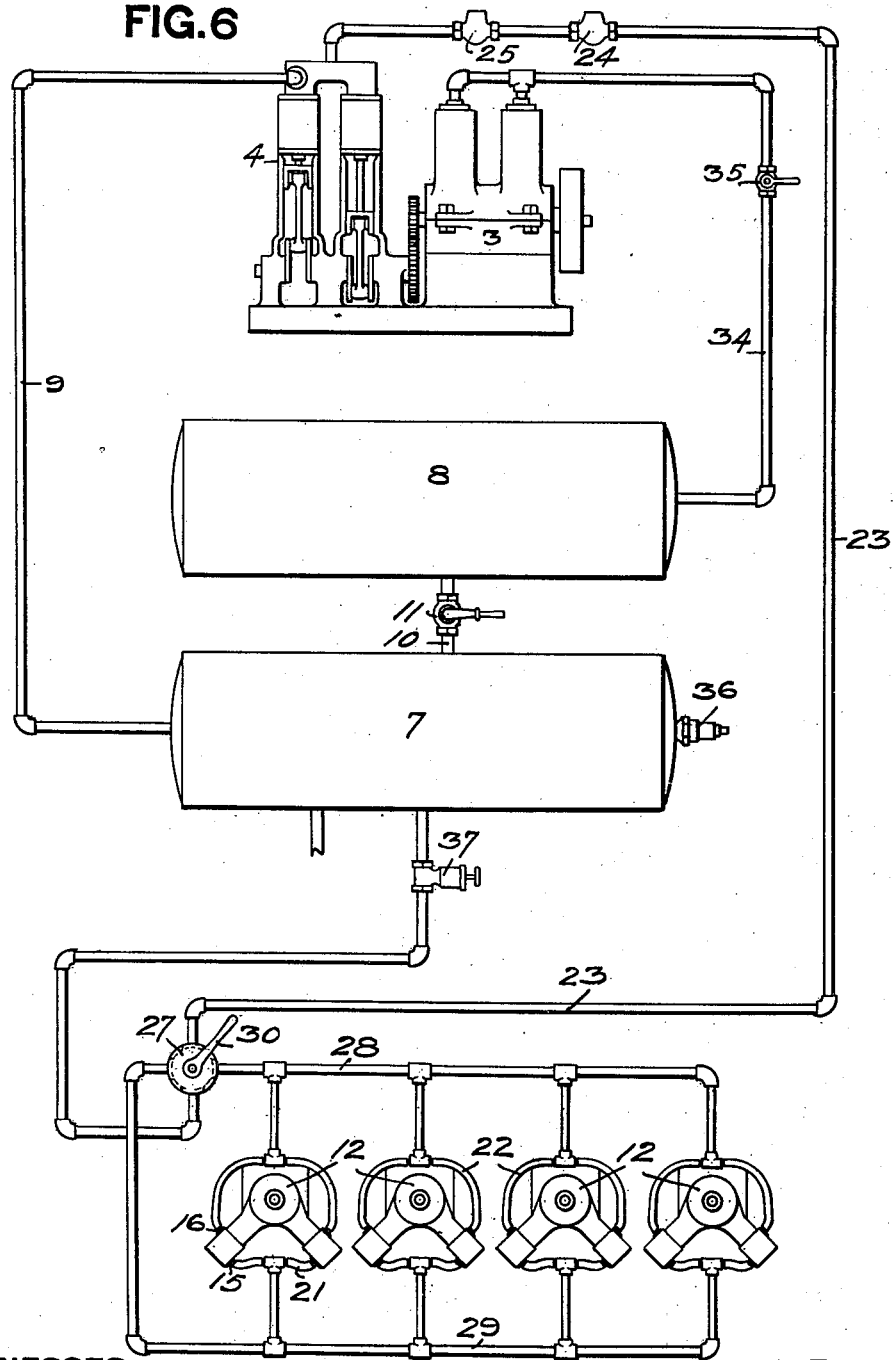

Figure 1 is a side elevation of a vehicle having mounted thereon a mechanism embodying my invention. Fig. 2 is a front end view partly in section. Fig. 3 is a plan with vehicle body removed showing the air motors on each wheel and the method of steering partially diagrammatic. Fig. 4 shows three sectional views of the controlling valve in different positions. Fig. 5 is an elevation partly in section of one of the propelling motors. Fig. 6 is a diagram showing the connection of the various parts and their relation to each other.

Referring to Fig. 1, 2 is the vehicle body having mounted thereon a gas engine 3, preferably of the multi-cylinder type, and an air compressor 4, the gas engine being in driving connection with the compressor, which is accomplished preferably by means of suitable gearing.

The front wheels 5 of the vehicle and the rear wheels 6 may be adapted to turn on pivots or knuckle joints to control the motion of the vehicle. The reservoirs 7 and 8 for compressed air are secured to the body 2.

The compressor is connected by a pipe 9 with reservoir 7, so as to deliver compressed air to said reservoir. The reservoir 8 is connected to reservoir 7 by a pipe 10 having a valve 11, so that air may be admitted to reservoir 8 from reservoir 7, and the two reservoirs may be operated thus connected or air may be bottled up in reservoir 8 for future use.

The numeral 12 indicates suitable motors adapted to use compressed air, located upon the stub shaft 13 by which the wheels are pivoted to the vehicle. Said motors are geared as indicated so as to drive the wheels, there being a motor for each wheel. These motors comprise the cylinders 14 having the inlet 15 and exhaust 16. Pistons in said cylinders are connected by connecting rods 17 with the crank pins 17$^b$ on the disk 17$^c$ to impart a rotary movement thereto and to the shaft 18 upon which the pinion 19 is secured which meshes with the large gear wheel 20 on the wheel. The motors are connected with the reservoir by flexible connections 21 so that the compressed air from the reservoirs shall be delivered to the intake 15 of the motors. The exhausts 16 of the motors are connected by flexible connections 22 to a pipe 23 (see Fig. 5,) leading to the intake ports of the compressor. In the pipe 23 are placed valves 24 and 25, one of said valves opening outward and the other inward.

By means of the controlling valve 27 the pipe 28 which receives the exhaust from the motors directly, may be put in communication with the pipe 23 leading to the intake port of the compressor, at the same time putting the reservoir 7 in communication with the pipe 29 communicating directly with the intake ports 15 of the motors. By turning the handle 30 of said valve 27 to the left, the connections above indicated are made through the passages 31 and 32 in the plug 33 (see Fig. 4.) By turning the handle 30 to the right, the pipe 28 may be put in communication with the reservoir 7 by the passage 31 and at the same time the pipe 23 will be put in communication with the pipe 29 through the passage 32 thus reversing the motors.

The pipe 34 connects the air reservoir 8 with the gas engine cylinders. A valve 35 in said pipe is provided by which the pipe may be closed or opened to start the engine.

If desired the compressed air may be used to operate a small auxiliary air motor for starting the gas engine. A safety valve 36 is connected to reservoir 7 to prevent the accumulation of too great pressure.

The oil cup 37 or means for supplying oil to the air circulating system is provided to lubricate the various mechanism of said system.

The reservoirs and all the piping may be insulated to retain heat and it will be noticed that they form a continuous or closed system. As it is well understood, the act of compressing air in a cylinder generates heat, which heat is imparted to the air. If now the air be immediately expanded, all the heat of compression can be regained and converted into work. In the ordinary operation of compressed air motors, acting at a distance from the compressor, the air being conveyed from compressor to motors through long pipe lines, all the heat of compression is lost. In addition to this, the air when entering the motors has cooled to practically atmospheric temperature, and when expanded in a motor cylinder the temperature is much reduced, producing freezing of the pipes and difficulties in lubrication.

By the use of the air practically immediately, or shortly after compression, as contemplated in the present invention, the efficiency is much increased, and the lubrication is attended with little or no difficulty. By the introduction of oil into the closed system of piping forming the circuit of the working air, the compressor and motor cylinders are automatically lubricated in a simple and thorough manner and the same oil is used repeatedly. While attaining the advantage due to using the air soon after compression, and in its heated state, I retain the flexibility due to large storage capacity between compressors and motors. This is effected by sub-dividing the reservoir in such manner that a small part of it only is used in ordinary operation; that is when the power required at the wheels is not in excess of that of the engine. The remainder of the reservoir is then used for storage only. Of course the air therein contained will cool to atmospheric temperature, with the corresponding loss of efficiency when used. When excess power is demanded at the wheels, for instance, in hill climbing, the whole reservoir capacity would be thrown into use by opening the valve 11. The air motors (total) would usually have about twice the power of the prime mover; this reduces the cost of the generating unit, and still permits of the vehicle developing high power at the wheels for a short time, when needed. This high power may be developed intermittently in climbing steep hills, allowing the engine and compressor to run continuously, and stopping the vehicle between times until the reservoirs are again charged.

The air motors are of such construction that they may be easily mounted on the stub shaft, or pivot of wheels; and are so constructed as to have no dead centers. Each motor has two double acting cylinders set at approximately a right angle, and both working on a common shaft. In the preferred construction the connecting rods of each motor work on a common, or single crank pin, so that the cylinders are in the same plane. This construction is very simple and inexpensive. The motors are reversed by the simple expedient of reversing the flow of air through them, thus dispensing with reversing valve gears, etc.

It will be noted that with my invention no speed changing gears, differential gears, or driving shafts are needed; that the principal mechanisms, viz: engine and compressor, can be located in a closed compartment in the body, and protected from dust and dirt, and further that the method of driving is very flexible and reliable. In case of disablement of one or more of the air motors, the same can be cut out of action and the vehicle operated by the remaining motors.

In case of the engine or compressor becoming disabled the vehicle could be run for a short distance to a convenient place, by means of the air stored in the reservoir, or additional stored air could be supplied in steel bottles thus obviating the necessity for towing with another vehicle.

In the ordinary operation of my invention it is intended that the air shall pass from the compressor to motors, and thence back to the compressor, the same air (charged with lubricant) being used repeatedly. However since the demand for power at the wheels may vary considerably at times, I have provided for this occurrence as follows: Should the compressor be working at higher power than the motors (that is, demanding more air than the exhaust from motors will supply) it will draw in atmospheric air to supply the deficiency, through the port of the valve 24; should the motors be working at a greater power than the compressor, (that is, exhausting more air than the compressor will receive) an accumulation of air in the exhaust pipe will be prevented by such air escaping through the port of valve 25.

The steering of my improved vehicle is effected by compressed air taken from reservoirs 7 and 8, or may also be done by hand. (This forms the subject matter of a separate application filed by me on the 9th day of March, 1907, Serial No. 361,623.)

Referring to Fig. 3, the stub shafts carrying the wheels have mounted thereon the levers 38; connected to these levers by links 39 are pistons 40 working in double cylinders 41. These cylinders are supported by the reach bar 42, the same being pivotally connected to axles 43. The cylinders 41 are also clamped or fastened to axles 43, so that they are at all times parallel with the axles.

The cylinders 41 are divided by a division wall 44 and the pistons 40 in each cylinder are connected by a rod 45 so that both move together. Between the pistons 40 and the division wall 44 there are inserted strong coil springs 46. These springs are in close contact with the ends of the pistons 40 and with the division wall 44, so that no steering movement of the wheels can take place without compressing one or the other of these springs.

Mounted on the dash board or other location convenient to the driver, I provide two four way valves 47 of ordinary construction, similar to valve 27. These valves are connected to the reservoir 7 by suitable piping and also one of them to each steering cylinder 41, in such manner that air pressure may be applied to either end of the cylinder at will. By this arrangement it is obvious that the air pressure will overcome the resistance of the springs 46 and cause the wheels to assume various positions, the same being controlled by the four way valves. In order to steer either set of wheels independently, I provide two valves, and two cylinders, but the valves would usually be connected in such a manner that both could be operated by one movement, thus steering all four wheels at once. In order to provide against possible breaks in the air connections, cylinders, springs, etc., of the air steering devices, I also provide on the front end of the vehicle, levers 38ª, extending forward from the stub shaft carrying the wheels, these levers being connected by a link 48 having mounted thereon a curved rack or gear segment 49. Engaging with this rack there is a pinion 50 and connected to this pinion by a vertical shaft a hand steering wheel 51.

In the operation of braking, I also use compressed air from reservoir 7, by simply reversing the air motors, thereby applying a powerful and elastic brake equally to all four wheels. It will thus be seen that I provide a vehicle the forward and backward movements, and the braking of which, are accomplished by the control of a single valve lever, conveniently located; that the steering of either front or rear wheels is easily effected by another valve, or valves, that the vehicle can be started with stored air, and that the prime mover can be started in the same way, that the power is applied to all wheels, and can be largely in excess of that developed by the prime mover, and that the whole apparatus is simple, reliable, easy to operate, and gives extreme facility of control by the operator, at the same time dispensing with a multiplicity of devices required when the power of the prime mover is applied to the wheels directly, as by shafts and gears.

What I claim is:

1. In a motor vehicle, the combination of a prime motor, an air compressor, the motor being adapted to drive the compressor, an air motor adapted to propel the vehicle, means for supplying the compressed air to said motor, and connections between the exhaust port of the air motor and the intake port of the compressor.

2. In a motor vehicle, the combination of a prime motor, an air compressor adapted to be driven by said motor, a reservoir adapted to receive the compressed air from said compressor, an air motor adapted to receive its air from said reservoir and to drive the vehicle, and means for connecting the exhaust port of the air motor with the intake port of the compressor.

3. In a motor vehicle, the combination of a prime motor, an air compressor adapted to be driven by said motor, a reservoir adapted to receive its compressed air from said compressor, an air motor adapted to receive its air from said reservoir and to drive the vehicle, a closed passage leading from the exhaust port of the air motor to the intake port of the compressor, and a non-return valve opening from the outer air to said passage.

4. In a motor vehicle, the combination of a prime motor, an air compressor adapted to be driven by said motor, a reservoir adapted to receive its compressed air from said compressor, an air motor adapted to receive its air from said reservoir and to drive the vehicle, a closed passage leading from the exhaust port of the air motor to the intake port of the compressor and a valve adapted to open said passage to the outer air at a predetermined pressure in said passage.

5. In a motor vehicle, the combination of a prime motor, an air compressor adapted to be driven by said motor, an air reservoir adapted to receive its air from said compressor, and an independent motor on each of a plurality of wheels of said vehicle adapted to drive the same, the air motors being adapted to receive their air from said reservoir.

6. In a motor vehicle having four driving wheels, the combination of a prime motor on said vehicle, an independent secondary motor for each of said driving wheels mounted on the axles adapted to drive said wheels, and means for conveying the power from said primary motor to said secondary motor.

7. In a motor vehicle, the combination of a prime motor, an air compressor adapted to be driven by said prime motor, an air reservoir on said vehicle, an air motor adapted to propel the vehicle and to receive its air from said reservoir, and means for connecting said reservoir with the cylinder of said gas engine to start said engine.

8. In a motor vehicle, the combination of a prime motor, an air compressor adapted to be driven by said prime motor, triangular shaped double cylinder motors on the axles, connections between said motors and the compressor, and connections between said motors and the wheels.

9. In a motor vehicle, the combination of a prime motor, an air compressor adapted to be driven by said motor, an air reservoir on said vehicle, an independent air motor on each of the wheels of said vehicle adapted to receive their air from said reservoir, a controlling valve suited to control all said motors, and suitable pipes connecting said reservoir and air motors.

10. In a motor vehicle, the combination of a pivoted wheel, a motor mounted on the axle of said wheel so as to turn therewith about its pivot, a prime motor on the vehicle, and means for conveying the power from said prime motor to the motor upon the axle.

11. In a motor vehicle provided with two or more wheels having their axles pivoted to said vehicle, a driving motor upon each of said axles, a prime motor upon the vehicle, and means for conveying the power of said prime motor to the motors upon said axle.

12. In a motor vehicle having two or more driving wheels, the combination of a prime motor on said vehicle, an air compressor on said vehicle adapted to be actuated by said prime motor, and an independent secondary air motor upon the axles for each of said driving wheels adapted to drive the same, and means for conveying the compressed air from said compressor to said secondary motor.

13. In a motor vehicle, the combination of a pivoted wheel, a compressed air motor mounted on the axle of said wheel so as to turn therewith about its pivot, a prime motor on the vehicle, an air compressor on said vehicle adapted to be operated by said prime motor, and means for conveying the compressed air from said prime motor to the motor upon the axle.

14. In a motor vehicle provided with four wheels having their axles pivoted to said vehicle, a compressed air driving motor upon each of said axles, a prime motor upon the vehicle, an air compressor upon said vehicle adapted to be operated by said prime motor, and means for conveying the compressed air from said compressor to the motors upon said axle.

15. In a motor vehicle, the combination of a pivoted wheel, a compressed air motor mounted on the axle of said wheel so as to turn therewith about its pivot, a prime motor upon the vehicle, an air compressor on said vehicle adapted to be operated by said prime motor, a flexible conveying pipe communicating with the intake of the compressed air motor and with the discharge port of said compressor.

16. In a motor vehicle, a prime motor, an air compressor driven by said prime motor, one or more air motors adapted to drive the wheels, and a subdivided reservoir intermediate said air motors and said compressor so arranged that a small portion of the same only may be in connection with the air motors and compressor.

17. In a motor vehicle, a prime motor, an air compressor driven by said prime motor, one or more air motors adapted to drive the wheels, a subdivided reservoir intermediate said air motors and said compressor, and a valve controlling the connection between the subdivisions of said reservoir.

18. In a motor vehicle, the combination of an axle, a stub-shaft, a wheel mounted on said stub-shaft, a motor supported by said stub-shaft, said motor comprising two cylinders arranged obliquely to each other, connecting rods, a crank-disk, connections between said crank disk and said wheel, and means for driving said motor.

In testimony whereof, I the said WALTER W. MACFARREN have hereunto set my hand.

WALTER W. MACFARREN.

Witnesses:
ROBERT C. TOTTEN,
J. R. KELLER.